Patented Apr. 22, 1930

1,755,362

UNITED STATES PATENT OFFICE

MARK E. PUTNAM, OF MIDLAND, MICHIGAN, ASSIGNOR TO THE DOW CHEMICAL COMPANY, OF MIDLAND, MICHIGAN, A CORPORATION OF MICHIGAN

METHOD OF MAKING SODIUM SALICYLATES

No Drawing.   Application filed April 6, 1923. Serial No. 630,396.

The present improved method or process relates more particularly to the commercial manufacture of sodium salicylate, as it is ordinarily termed, or mono-sodic salicylate ($C_6H_4.OH.COONa$), as it may be more accurately designated. In the usual method of making such sodium salicylate, pure salicylic acid is carefully neutralized, preferably with sodium bi-carbonate to form a solution of sodium salicylate of a concentration which will permit convenient filtration. The resulting solution is then filtered to remove trash and foreign matter. It is then concentrated by boiling to a gravity of approximately 35 deg. Bé. taken hot. This solution is then cooled to room temperature and at 20 deg. C. will precipitate a crop of crystals, not exceeding in quantity 50 per cent of the sodium salicylate content and preferably approximately 40 per cent of that content in a better grade of product. Such crystals are anhydrous and in the form of very thin, soft plates, very difficult to separate from the mother liquor, even by the most improved methods. The crystals so obtained are next drained, preferably by centrifuging and are then washed. The mother liquor is returned to the neutralizing step for re-saturation to obtain further crops of crystals. The centrifuged crystals are dried and, if desired, are ground to produce the powdered form of product. The mother liquor becomes contaminated by exposure to air and apparatus and must frequently be removed from the process in order to maintain a quality of product which will pass standard specification. In spite of all precautions, the sodium salicylate produced by this method has a decided pinkish or yellowish tint and a concentrated solution has an amber color, whereas pure sodium salicylate is white and a concentrated solution is colorless.

In addition to such flat or plate-like form of crystal in which sodium salicylate thus regularly crystallizes, it has been observed also to form a well defined rhombic type of crystal which is relatively large and separates from the mother liquor extremely well as distinguished from such ordinary crystals, such rhombic form of crystal being further characterized by containing six molecules of water of crystallization, as indicated by the formula ($C_6H_4.OH.COONa.6H_2O$). The conditions which determine the initial formation of this last mentioned type of crystal have apparently never been thoroughly understood and their production has been regarded as a rare and more or less inexplicable phenomenon.

I have now discovered, however, a method whereby the formation of this desirable type of sodium salicylate crystals may be promoted and controlled so as to render possible the precipitation of the salt in this form on a commercial scale, and to the accomplishment of this object, the invention, then, consists of the steps hereinafter fully described and particularly pointed out in the claims, the following description setting forth but one of the various ways in which the principle of the invention may be used.

In carrying out my present improved procedure, I make up a solution of sodium salicylate in accordance with any of the known methods, as for example by neutralizing salicylic acid with sodium bi-carbonate, as described above. As in the current practice, such solution will preferably be slightly acid. This solution is made up of such a strength that when cooled to 15 deg. C., it will not crystallize as normally. That is, the usual high concentration is avoided, since that would result in production of plate-form crystals. It is therefore readily filterable, if necessary to remove insolubles, trash, or foreign matter. I preferably then cool the solution to a temperature approximating 5 to 6 degrees C., having adjusted the strength of the solution so that no crystallization will take place at that temperature. I then inoculate the solution with sodium salicylate crystals of the $6H_2O$ type and allow the solution to stand, whereupon approximately 70 per cent of the sodium salicylate content of the batch crystallizes in the well defined rhombic crystals, the size of which may be regulated by the rate of cooling. Larger crystals are obtained by a slower cooling.

Inasmuch as the original formation of crystals of this type cannot, so far as I am aware, be predicated on the presence or absence of any particular factors, so that their formation is apparently not only extremely rare but so far as at present known accidental, it is highly important in carrying out my present process that a stock of such crystals be at all times maintained so that successive batches of the solution may be thus inoculated and the salt caused to precipitate in the desired form. In other words, a seed supply of such crystals is essential.

The crystals so obtained are then centrifuged and washed, the mother liquor is returned to the neutralizing step, the crystals are dried and if necessary ground, as may be desired. By this method there is produced a sodium salicylate, which is white and the concentrated solution of which is clear. It is further unnecessary to concentrate the solution after filtration, as in the usual process and much less mother liquor is returned and that mother liquor is subject to less contamination in the modified process than in the ordinary process.

Among the additional and already stated advantages of my improved process are the following: The $6H_2O$ crystals are relatively hard and firm especially if grown slowly to large size. The crude liquor may be made up cold if desired and filtration is easy because the concentration is less than required for the anhydrous crystals. No further concentration after making up the solution is required, and the contamination of the liquor in that step is avoided.

More product per batch is obtained, that is, a larger percentage of the salicylate is separated as crystals. I find it convenient to get 70 per cent of the content in crystals as contrasted with 45 per cent of the anhydrous crystals. There is less mother liquor to rework and because the liquors are not re-heated or maintained at a high temperature for considerable time as in the usual process, the mother liquor is not fouled so rapidly and there is much less of it to discard from the process. There is also less material in process per unit of daily output. The hydrated ($6H_2O$) form of crystals separate out remarkably free from impurities and the mother liquor is easily drained from them and they are easily washed. The process gives a very high grade of pure, white product, not otherwise obtainable. This product is superior in purity and color to all grades of sodium salicylate obtainable in quantity on the market and is even superior to a certain special refined grade available upon special specification. My improved process is applicable to the manufacture of all of the output of a sodium salicylate process for the production of a high grade product. Approximately 30 per cent only of the product is returned in the mother liquor as contrasted with 55 per cent in the usual process. The improved product readily dissolves in water to give a practically colorless solution which is not true of any sodium salicylate on the market at the present time. Such improved product moreover, when ground, is perfectly white, which again is not true of the best commercial salicylate. The process has the obvious advantage of requiring much less time, labor and heat than the ordinary process and involves the discard of a markedly lower percentage of product in fouled mother liquors.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a process of making substantially pure sodium salicylate from a solution thereof containing impurities, the steps which consist in cooling such solution to a temperature under 15° C., such solution being made up too dilute to form anhydrous crystals at such temperature, seeding such cooled solution with crystals of sodium salicylate hexahydrate, thereby causing crystallization of a large proportion of a dissolved salt in like form only, separating such crystals from the mother liquor with its impurities, and then washing and drying such crystals, whereby without further repurification a white anhydrous salt is produced free from tint of color and capable of being dissolved to a clear water-white solution.

2. In a process of making substantially pure sodium salicylate from a solution thereof containing impurities, the steps which consist in cooling such solutions to about 5° C., the strength of the solution being adjusted so that no crystallization of the normal anhydrous salt will take place at that temperature, then seeding such cooled solution with crystals of sodium salicylate hexahydrate, thereby causing crystallization of a large proportion of the dissolved salt in like hexahydrate form only, separating such crystals from the mother liquor with its impurities, and then washing and drying such crystals, whereby without further repurification a white anhydrous salt is produced free from tint of color and capable of being dissolved to a clear water-white solution.

3. In a process of making substantially pure sodium salicylate, the steps which consist in neutralizing commercial salicylic acid with a sodium compound in water solution to obtain therefrom a slightly acid solution of sodium salicylate of such a strength that when cooled to 15° C., the normal anhydrous salt will not crystallize out, seeding such cooled solution with crystals of sodium salicylate hexahydrate, thereby causing crystallization of a large proportion of the dissolved salt in like hexahydrate form only, separating such crystals from the mother liquor with its impurities, and then washing and drying such crystals, whereby without further repurification a white anhydrous salt is produced free from tint of color and capable of being dissolved to a clear water-white solution.

Signed by me, this 2 day of April, 1923.

MARK E. PUTNAM.